United States Patent

Ji

(10) Patent No.: US 9,140,447 B2
(45) Date of Patent: *Sep. 22, 2015

(54) TWO STAGE DRY FEED GASIFICATION PROCESS

(71) Applicant: Lummus Technology Inc., Bloomfield, NJ (US)

(72) Inventor: Shuncheng Ji, Katy, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/713,572

(22) Filed: Dec. 13, 2012

(65) Prior Publication Data

US 2013/0099168 A1    Apr. 25, 2013

Related U.S. Application Data

(63) Continuation of application No. 12/732,290, filed on Mar. 26, 2010, now Pat. No. 8,357,216.

(60) Provisional application No. 61/165,784, filed on Apr. 1, 2009.

(51) Int. Cl.
    *C01B 3/36* (2006.01)
    *F23B 30/00* (2006.01)
    (Continued)

(52) U.S. Cl.
    CPC . *F23B 5/025* (2013.01); *C10J 3/54* (2013.01); *C10J 3/56* (2013.01); *C10J 3/721* (2013.01); *C10J 3/84* (2013.01); *C10J 2300/093* (2013.01); *C10J 2300/165* (2013.01); *C10J 2300/1807* (2013.01); *C10J 2300/1884* (2013.01); *C10J 2300/1892* (2013.01); *Y02E 20/18* (2013.01); *Y02E 50/32* (2013.01)

(58) Field of Classification Search
    CPC ................. C10J 2300/1807; C10J 2300/1823; C10J 2300/1884; C10J 3/56; C10J 3/84; C10J 2300/0909; C10J 2300/0903; C10J 3/66
    See application file for complete search history.

(56) References Cited

U.S. PATENT DOCUMENTS 3,847,563 A     11/1974  Archer et al.
3,963,426 A *   6/1976   Hand .......................... 48/197 R
(Continued)

FOREIGN PATENT DOCUMENTS

| JP | 60032889 | 2/1985 |
|----|----------|--------|
| WO | 03055962 | 7/2003 |
| WO | WO 2009043540 A1 * | 4/2009 |

OTHER PUBLICATIONS

Glenn, J. "Operation of the Bi-Gas Coal Gasification Pilot Plant" Coal Processing Tech. 7:14-25 (1981).

(Continued)

*Primary Examiner* — Imran Akram
(74) *Attorney, Agent, or Firm* — Osha • Liang LLP

(57) ABSTRACT

A dry feed two stage gasification system and process is disclosed for gasifying feedstock such as carbonaceous materials with improved energy efficiency, along with reductions in feedstock consumption and carbon dioxide emissions. The feedstock is first dried and pretreated with the hot syngas in the upper section of the gasifier to generate a dry char that is low in volatile-matter content. This dry char is sent to the first stage of a two stage gasifier where it reacts with oxygen in the presence of steam to produce a hot syngas stream.

10 Claims, 2 Drawing Sheets

(51) Int. Cl.
*C10J 3/56* (2006.01)
*C10J 3/72* (2006.01)
*C10J 3/84* (2006.01)
*C10J 3/54* (2006.01)

(56) References Cited

U.S. PATENT DOCUMENTS

| | | |
|---|---|---|
| 3,972,690 A | 8/1976 | Van Os |
| 4,022,591 A | 5/1977 | Staudinger |
| 4,049,133 A | 9/1977 | Staudinger |
| 4,069,024 A | 1/1978 | Fernandes |
| 4,146,370 A | 3/1979 | Van Herwijnen et al. |
| 4,158,637 A | 6/1979 | Jones |
| 4,193,773 A | 3/1980 | Staudinger |
| 4,209,304 A | 6/1980 | Kessler et al. |
| 4,248,604 A | 2/1981 | Woldy et al. |
| 4,312,638 A | 1/1982 | Koump |
| 4,721,514 A | 1/1988 | Kikuchi et al. |
| 4,823,741 A | 4/1989 | Davis et al. |
| 4,851,013 A | 7/1989 | Luke |
| 4,874,397 A | 10/1989 | Heitz |
| 4,959,080 A | 9/1990 | Sternling |
| 4,963,162 A | 10/1990 | Sternling |
| H1325 H | 7/1994 | Doering et al. |
| 5,435,940 A | 7/1995 | Doering et al. |
| H1538 H | 6/1996 | Harryman |
| 5,931,978 A | 8/1999 | Oortwijn et al. |
| 6,141,796 A | 11/2000 | Cummings |
| 2004/0182294 A1* | 9/2004 | Hahn et al. .................... 110/347 |
| 2008/0210089 A1* | 9/2008 | Tsangaris et al. ................. 95/90 |
| 2009/0188165 A1 | 7/2009 | Ariyapadi |
| 2010/0311847 A1* | 12/2010 | Kowoll .......................... 518/702 |

OTHER PUBLICATIONS

Glenn, J. "Operation of the Bi-Gas Coal Gasification Pilot Plant" Coal Processing Tech. 7, pp. 14-25 (1981).
Second Office Action (with translation) issued Jan. 30, 2014 in corresponding Chinese application No. 201080015480.9 (5 pages).
Notice of Reasons for Rejection (w/translation) issued Sep. 2, 2014 in corresponding Japanese application No. 2012-503617 (6 pages).
Notice of Reasons for Rejection (w/translation) issued Mar. 27, 2014 in corresponding Japanese application No. 2012-503617 (6 pages).
Correspondence reporting a Third Office Action issued Aug. 14, 2014 in corresponding Chinese Patent application No. 201080015480.9 (5 pages).

* cited by examiner

TWO STAGE DRY FEED GASIFICATION PROCESS

CROSS-REFERENCE TO RELATED APPLICATIONS

This application is a Continuation Application of U.S. Ser. No. 12/732,290, filed Mar. 26, 2010 and entitled "Two Stage Dry Feed Gasification System And Process", which claims benefit under 35 USC §119(e) to U.S. Provisional Application Ser. No. 61/165,784 filed Apr. 1, 2009. Each patent application identified above is incorporated here by reference in its entirety.

STATEMENT REGARDING FEDERALLY SPONSORED RESEARCH OR DEVELOPMENT

None.

FIELD OF THE DISCLOSURE

The present invention relates to a gasification system and process for converting generally solid feedstock such as carbonaceous material into desirable gaseous products such as synthesis gas.

BACKGROUND

Gasification processes are widely used to convert solid or liquid feedstocks such as coal, petroleum coke and petroleum residue into synthesis gas (syngas). Syngas is an important intermediate feedstock for producing chemicals such as hydrogen, methanol, ammonia, synthetic natural gas or synthetic transportation oil. Syngas can also be used to generate electricity through a process known as Integrated Gasification Combined Cycle (IGCC).

The common practice for gasification processes is to contact a feedstock with oxygen directly above the auto-ignition temperature of the fuel. The drawback of this practice is that a portion of the combustion heat is consumed to heat up the feedstock and to vaporize the moisture carried in by the feedstock, the end result being a reduction in the energy efficiency of the process. Lower energy efficiency translates to higher feedstock consumption and greenhouse gas emissions. Thus, there is a need to develop gasification systems and processes that overcome the above drawback.

SUMMARY

The present disclosure relates to a dry feed two stage gasification process for gasifying feedstock such as carbonaceous materials with improved energy efficiency along with lower feedstock consumption and $CO_2$ emissions.

Certain embodiments of the process comprise the steps of: (a) providing a gasification reactor comprising a reactor upper section and a reactor lower section; (b) introducing a solid carbonaceous feedstock and a gas stream into a chamber and mixing to produce a warm solid-gas mixture comprising a substantially dry solid carbonaceous feedstock, where the gas stream comprises syngas produced by the gasification reactor of step (a), where said warm solid-gas mixture is maintained at a temperature that minimizes the formation of tar; (c) separating the warm solid-gas mixture in a separating device to produce a separated substantially dry carbonaceous feedstock and a separated gaseous product; (d) passing the separated, substantially dry carbonaceous feedstock into the reactor upper section and reacting with a first mixture product passed from a reactor lower section to the reactor upper section, where the reacting forms a second mixture product, where the second mixture product is at a temperature in a range of between 1500° F. to 2000° F. when it leaves the reactor upper section; (e) passing the separated gaseous product to a particulate filtering device to separate out at least a portion of the residual solid fines and particulates; and (f) passing the residual solid fines and particulates separated by the particulate filtering device to the reactor upper section.

In certain embodiments, the warm solid-gas mixture is maintained at a temperature in a range of 300° F. to 1000° F. when inside the chamber. In certain embodiments, the warm solid-gas mixture is maintained at a temperature in a range of 500° F. to 800° F. when inside the chamber.

The solid carbonaceous feedstock and the residual solids fines and particulates may be introduced to the reactor upper section by one or more feeding devices. The gas stream, the second solid product exiting first separating device, and the steam produced from the heat recovery unit maybe introduced into the reactor lower section by one or more dispersion devices. The carbonaceous material is selected from the group consisting of coal, lignite, petroleum coke and mixtures thereof. The oxygen-containing gas may be selected from air, oxygen-enriched air, oxygen and mixtures thereof. The heat recovery unit may be selected from the group consisting of a radiant heat type boiler, water tube boiler, fire tube boiler and combinations thereof. The first and second separating devices may each comprise a cyclone. The temperature of the second mixture product leaving the upper section of the gasifier may be between about 1200° F. and 2500° F. prior to entering into the first separating device, but preferably is between 1500° F. and 2000° F. The warm solid-gas mixture is maintained at a temperature in a range of 300° F. to 1000° F., but preferably in the range of 500° F. to 800° F.

In certain embodiments, the second solid product stream exiting the first separating device, the steam exiting the heat recovery unit, and the gas stream of part (e) may be passed into the reactor lower section by one or more dispersion devices. The temperature of the second mixture product prior to entering into the first separating device is between 1200° F. and 2500° F., but is preferably between 1500° F. and 2000° F.

BRIEF DESCRIPTION OF THE DRAWINGS

For a more detailed description of the embodiments, reference will now be made to the accompanying drawings, wherein.

DETAILED DESCRIPTION

The following detailed description of various embodiments references the accompanying drawings which illustrate specific embodiments in which the invention can be practiced. The embodiments are intended to describe aspects of the invention in sufficient detail to enable those skilled in the art to practice the invention. However, other embodiments can be utilized and changes can be made without departing from the scope of the present invention. Thus, the scope of the present invention is not limited to only the specific embodiments disclosed herein, but rather, the scope is defined only by the appended claims, along with the full scope of equivalents to which such claims are entitled.

Figure 1:
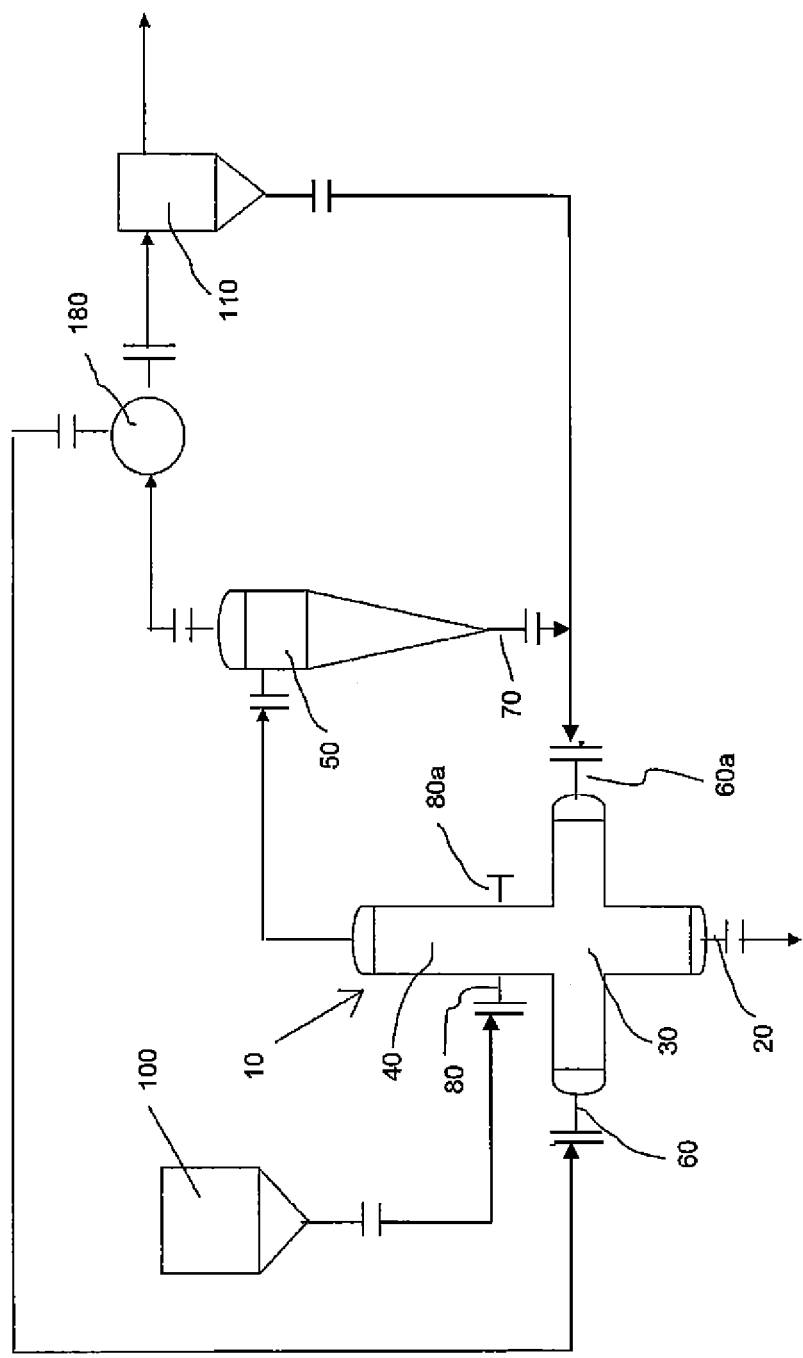
FIG. 1 is a schematic representation of a system useful in and a pictorial process flow diagram for an embodiment of the present invention.
Figure 2:
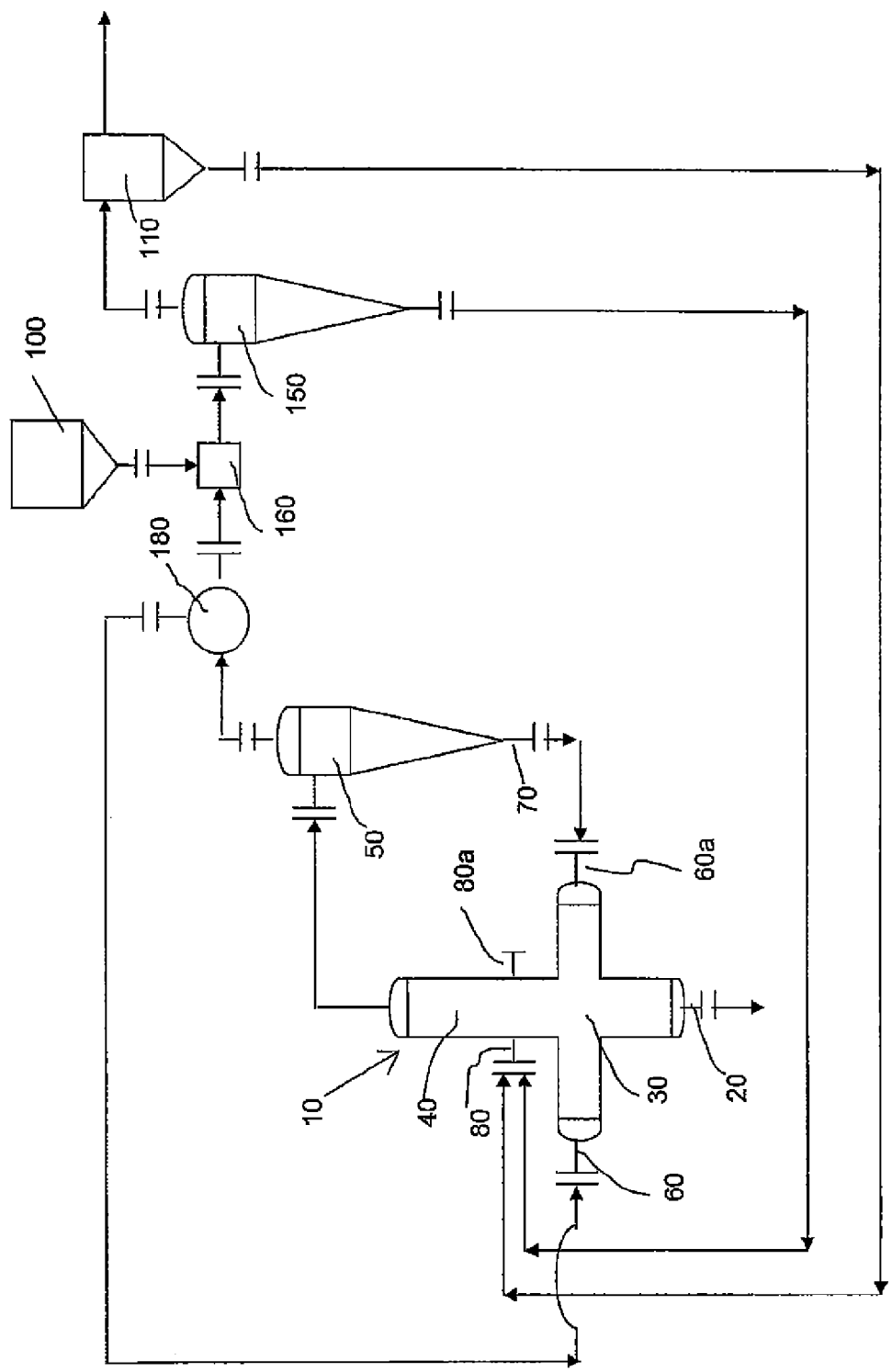
FIG. 2 is a schematic representation of a system useful in and a pictorial process flow diagram for an alternative embodiment of the present invention.

Referring to FIGS. 1 and 2, various embodiments of the present invention provide a gasification reactor, indicated generally by reference numeral 10 that has a reactor lower section 30 and a reactor upper section 40. The first stage of the gasification process takes place in the reactor lower section 30 and the second stage of the gasification process takes place in the reactor upper section 40. The reactor lower section 30 defines the first stage reaction zone, and will alternatively be referred to as the first stage reaction zone. The reactor upper section 40 defines the second stage reaction zone, and will alternatively be referred to as the second stage reaction zone.

According to the embodiment depicted in FIG. 1, solid feedstock is pulverized (by methods that are known in the art, but outside the scope of this disclosure) before entering a feeding system 100 such as, but not limited to, a lock-hopper system. The pulverized solid stream comprising particulate carbonaceous material from the feeding system 100 is injected into the gasification reactor 10 upper section 40 through feeding device 80 and/or 80a, or additional feeding devices (not shown). The carbonaceous material then comes into contact with the hot syngas rising from the gasification reactor 10 lower section 30. The carbonaceous material is dried and a portion of it is gasified via pyrolysis reactions such as the carbon steam reaction ($C+H_2O \rightarrow CO+H_2$). Pyrolysis reactions are endothermic, thus, the temperature of the mixture of carbonaceous material and syngas decreases as the mixture travels upwards through the upper section 40. By the time the second mixture product comprising un-reacted solid particulates (e.g. char) and a second gaseous product stream (e.g. syngas) leaves the top of the upper section 40 of the gasifier 10, the second mixture product temperature drops to the range between 1200° F. and 2500° F., but preferably to the range between 1500° F. and 2000° F.

Further according to the embodiment as shown in FIG. 1, the second mixture product, comprising un-reacted solid particulates and a second gaseous product stream, exits the reactor upper section 40 and is sent the a first separating device 50. The first separating device 50 splits the second mixture product into a second solid product stream and second gaseous product stream, leaving only a small fraction of residual solid fines in the second gaseous product stream. The second solid product stream falls by gravitational force, and exits the first separating device 50 via an outlet 70. The second solid product stream is then recycled back to the reactor lower section 30 of the gasifier 10 through dispersion devices 60 and/or 60a. These devices mix the recycled solids with gaseous oxidant during addition of the solids and oxidant to the first stage of the reactor. The construction of such dispersion devices is commonly understood by those having average skill in the art.

Further according to the embodiment as shown in FIG. 1, the second solid product stream (primarily including char) reacts with oxygen in the presence of superheated steam in the lower section 30 (or first stage reaction zone) of the gasifier 10. The primary reactions in the first stage are $C+O_2 \rightarrow CO_2$ and $C+\frac{1}{2}O_2 \rightarrow CO$. These exothermic reactions raise the temperature of the gas in the first stage to between 2000° F. and 3500° F. The hot syngas produced in the reactor lower section 30 flows upward to the reactor upper section 40 where it comes into contact with the carbonaceous feedstock. The feedstock particles are dried and heated to an elevated temperature by the hot syngas, then the dry particles react with steam to generate CO and hydrogen. The primary reactions in the second stage are the carbon-steam reaction and $C+H_2O \rightarrow CO+H_2$ and the water-gas reaction $CO+H_2O \rightarrow CO_2+H_2$. The carbon-steam reaction forms CO and $H_2$, thus, increasing the yield of these usable gases.

Again referring to the embodiment as shown in FIG. 1, the temperature of the first stage is higher than the ash melting point. Consequently, entrained ash particles agglomerate and become a viscous molten slag that flows down the sides of the gasifier to exit the reactor via the tap hole 20 and enter the quench chamber. The slag is water-quenched and ultimately collected as a solid slag product. Typically, the steam added to the reactor lower section 30 is generated in the heat recovery unit 180. Water is fed into the heat recovery unit 180, and is heated by the hot syngas exiting the upper section 40 of the gasifier 10. The produced steam is then routed to the lower section 30 of the gasifier 10 via dispersion devices 60 and/or 60a.

Further referring to FIG. 1, the second gaseous product stream exiting from the first separating device 50 comprises hydrogen, carbon monoxide, a small amount of methane, hydrogen sulfide, ammonia, nitrogen, carbon dioxide and small fraction of residual solid fines. After passing through the heat recovery unit 180, the cooled syngas is subsequently introduced into a particulate filtering device 110, whereby the residual solid fines and particulates are removed and recycled back to lower section 30 of the gasifier 10.

In an alternative embodiment depicted in FIG. 2, solid feedstock is pulverized before entering a feeding system 100 such as, but not limited to, a lock-hopper system. The pulverized solid stream comprising particulate carbonaceous material from the feeding system is sent to a solid-gas mixer 160 where it contacts with warm syngas exiting the heat recovery unit 180. The function of the mixer 160 is to provide sufficient residence time to reduce feedstock moisture content, thereby producing a substantially dry feedstock. The temperature of the warm syngas from the heat recovery unit 180 is kept in a range between about 300° F. and 1000° F., but preferably in a range between about 500° F. and 800° F. to avoid formation of tars in the mixer 160. Tar formation is not desirable, as it contaminates the syngas and makes downstream gas and wastewater treatment more expensive.

Further referring to FIG. 2, the warm solid-gas mixture exiting mixer 160 is passed through a second separating device 150, which splits the warm solid-gas mixture into a second solid product stream and a second gaseous product stream, leaving only a small fraction of residual solid fines in the gas stream. In certain embodiments, the second separating device may comprise a cyclone or other commercially-available method for separating particles from a gas stream. The second solid product stream leaving the second separating device 150 is recycled back to the reactor upper section 40 of the gasifier 10 via dispersion devices 80 and/or 80a, or additional feeding devices (not shown). The second gaseous product stream leaving the second separating device 150 is next introduced into a particulate filtering device 110, whereby residual solid fines and particulates are removed and recycled back to the upper section 40 of the gasifier 10 through feeding devices 80 and/or 80a (or additional feeding devices) as feedstock for the second stage reaction. The gaseous product exiting filtering device 110 comprises a raw syngas that is largely free of particulates. This raw syngas can then be further cleaned using processes that are outside the scope of this disclosure.

Further referring to FIG. 2, both the second solid product leaving the second separating device 150 and residual solid fines and particulates exiting from the particulate filtering device 110 return to the second stage of the gasifier, then come into contact with the hot syngas rising from the lower section 30 of the gasifier 10. The carbonaceous material is de-volatized and a portion of the solids is gasified via pyrolysis reactions in which $H_2$ and CO are produced. The unreacted solids are essentially char and ash. The pyrolysis reactions that predominant in the upper section 40 of the gasifier 10 are highly endothermic. Thus, the temperature of the carbonaceous material and syngas mixture decreases as it travels upwards through the upper section 40. By the time the second mixture product, comprising the second solid product stream (e.g. char) and second gaseous product stream (e.g. syngas) leave the top of the upper section 40 of the gasifier 10, the temperature of the second mixture product is in the range between 1200° F. and 2500° F., but more preferably in the range between 1500° F. and 2000° F.

Further referring to FIG. 2, the second mixture product comprising the second solid product stream and second gaseous product stream exiting the reactor upper section 40 is sent to a first separating device 50, which splits the mixture into a second solid product stream and second gaseous product stream, leaving only a small fraction of residual solid fines in the second gaseous product stream. The second solid product stream exiting separating device 50 is recycled back to the reactor lower section 30 of the gasifier 10 through dispersion devices 60 and/or 60*a* as feedstock for the first stage reaction.

Further according to the embodiment as shown in FIG. 2, the second solid product stream (primarily including char) reacts with oxygen in the presence of superheated steam in the first stage in the lower section 30 of the gasifier 10. The primary reactions occurring in the first stage include $C+O_2 \rightarrow CO_2$ and $C+\frac{1}{2}O_2 \rightarrow CO$, which are both highly exothermic. As a result, the temperature within the first stage is maintained in a range between 2000° F. and 3500° F. The heat produced by the first stage reaction zone 30 and carried upward by the gas stream is used for the second stage pyrolysis reactions that predominate in the unfired reactor upper section 40, including vaporization of the moisture carried in by the feed, the carbon-steam reaction and the water-gas reaction between the CO and $H_2O$.

Again referring to the embodiment as shown in FIG. 2, the temperature of the first stage is higher than the ash melting point. Consequently, entrained ash particles agglomerate and become a viscous molten slag that flows down the sides of the gasifier to exit the reactor via the tap hole 20 and enter the quench chamber. The slag is water-quenched and ultimately collected as a solid slag product. The steam added to the reactor lower section 30 may be generated from the heat recovery unit 180 using the heat from the hot syngas exiting from the second stage (upper section) of the gasifier 10.

Further referring to FIG. 2, the second gaseous product stream exiting from first separating device 50 comprises hydrogen, carbon monoxide, a small amount of methane, hydrogen sulfide, ammonia, nitrogen, carbon dioxide and small fraction of residual solid fines. After passing through the heat recovery unit 180, the warm syngas is sent to a mixer 160 where it comes into contact with pulverized solid feedstock, thereby forming a warm solid-gas mixture that serves to dry the feedstock. The temperature of the warm solid-gas mixture in mixer 160 is kept in a range between about 300° F. and 1000° F., but preferably between about 500° F. and 800° F. to minimize formation of tar. The warm solid-gas mixture exiting mixer 160 is next introduced into a particulate filtering device 110, whereby the residual solid fines and particulates are removed and recycled back to the upper section 40 of the gasifier 10, as previously described above.

In certain embodiments, as illustrated in FIGS. 1 and 2, the recycled char, a stream of an oxygen-containing gas, and steam enter the gasification reactor 10 lower section 30 through dispersion devices 60 and/or 60*a*, which are located at either end of the horizontally extended portions of the lower section 30. More than two dispersion devices can be used, for example, four, arranged 90 degrees apart. The sets of dispersion devices can also be on different levels and need not be on the same plane.

Again referring to the embodiments depicted in FIGS. 1 and 2, the unfired reactor upper section 40 connects directly to the top of the fired reactor lower section 30 so that the hot reaction products are conveyed directly from the reactor lower section 30 to the reactor upper section 40. This minimizes heat losses in the gaseous reaction products and entrained solids, thereby increasing process efficiency.

Further referring to the embodiments depicted in FIGS. 1 and 2, the dispersion devices 60 and/or 60*a* provide an atomized feed of the particulate solids such as char. The dispersion devices may be of the type having a central tube for the solids and an annular space surrounding the central tube containing the atomizing gas which opens to a common mixing zone internally or externally. Further, the feeding device 80 and/or 80*a* of the unfired reactor upper section 40 may also be similar to the dispersion devices described hereinabove. Dispersion devices 60 and/or 60*a*, or feeding devices 80 and/or 80*a* can be as are conventionally known to those skilled in the art.

The materials used to construct the gasification reactor 10 are not critical. Preferably, but not necessarily, the reactor walls are steel and are lined with an insulating castable or ceramic fiber or refractory brick, such as a high chrome-containing brick in the reactor lower section 30 and a dense medium, such as used in blast furnaces and non-slagging applications in the reactor upper section 40, in order to reduce heat loss and to protect the vessel from high temperature and corrosive molten slag as well as to provide for better temperature control, all of which are commercially available from several sources. Use of this type of system provides the high recovery of heat values from the carbonaceous solids used in the process. Optionally and alternatively, the walls may be unlined by providing a "cold wall" system for fired reactor lower section 30 and, optionally, unfired upper section 40. The term "cold wall", as used herein, means that the walls are cooled by a cooling jacket with a cooling medium, as is known conventionally in the art for prior art coal gasification systems. In such a system, the slag freezes on the cooled interior wall and thereby protects the metal walls of the cooling jacket against heat degradation.

The physical conditions of the reaction in the first stage of the process in the reactor lower section 30 are controlled and maintained to assure rapid gasification of the char at temperatures exceeding the melting point of ash to produce a molten slag from the melted ash having a viscosity not greater than approximately 250 poises. This slag drains from the reactor through the taphole 20, and is further processed in units outside the scope of this document.

The physical conditions of the reaction in the second stage of the gasification process in the reactor upper section 40 are controlled to assure rapid gasification and heating of the coal above its range of plasticity. The temperature of the reactor lower section 30 is maintained in a range between 1500° F. and 3500° F., preferably in a range between 2000° F. and 3200° F. and most preferably in a range between 2200° F. and 3000° F. Pressures inside both the reactor upper section 40 and lower section 30 of the gasifier 10 are maintained at atmospheric pressure or higher.

As uses herein, the term "oxygen-containing gas" that is fed to the reactor lower section 30 is defined as any gas containing at least 20 percent oxygen. Preferred oxygen-containing gases include oxygen, air, and oxygen-enriched air.

Any particulate carbonaceous material can be utilized as feedstock for the embodiments described herein. Preferably, however, the particulate carbonaceous material is coal, which without limitation includes lignite, bituminous coal, sub-bituminous coal, and any combinations thereof. Additional carbonaceous materials are coke derived from coal, coal char, coal liquefaction residue, particulate carbon, petroleum coke, carbonaceous solids derived from oil shale, tar sands, pitch, biomass, concentrated sewer sludge, bits of garbage, rubber and mixtures thereof. The foregoing exemplified materials can be in the form of comminuted solids.

When coal or petroleum coke is the feedstock, it can be pulverized before addition to the reactor upper section. In general, any finely-divided carbonaceous material may be used, and any of the known methods of reducing the particle size of particulate solids may be employed. Examples of such methods include the use of ball, rod and hammer mills. While particle size is not critical, finely divided carbon particles are preferred. Powdered coal used as fuel in coal-fed power plants is typical. Such coal has a particle size distribution such that 90% (by weight) of the coal passes through a 200 mesh sieve. A coarser size of 100 mesh average particle size can also be used for more reactive materials, provided that a stable and non-settling slurry can be prepared.

As used herein, the term "char" refers to unburned carbon and ash particles that remain entrained within a gasification system after production of the various products.

As used herein, the term "substantially dry" means lacking in significant moisture content, but is not necessarily synonymous with absolute dryness.

EXAMPLE

Table 1 demonstrates the performance of the two-stage dry feed process and system as described herein. A computer simulation of the process as described herein was performed, based on Illinois 6 coal, with the gasifier pressure set at 523 psia, and the gas temperature leaving the second stage of the gasifier was set at 1890° F. With the process parameters as listed in the Table 1, the calculated cold gas efficiency for the process was 84.6%. This calculated cold gas efficiency is 10% higher than that achieved by the current slurry-fed E-Gas™ gasification process (ConocoPhillips Co.), while oxygen consumption is calculated to be reduced by 15% versus the E-Gas™ process.

TABLE 1

| | |
|---|---|
| Oxygen rate (lb/hr) | 1.54E+05 |
| Coal HHV (dry), (btu/lb) | 12,500 |
| Coal (dry) flow rate (lb/hr) | 2.23E+05 |
| Total HHV of Coal, btu/hr | 2.79E+09 |
| Net syngas yield: | |
| $H_2$ (lb/hr) | 1.68E+04 |
| $CH_4$ (lb/hr) | 2.43E+02 |
| CO (lb/hr) | 3.06E+05 |
| Total HHV of syngas (btu/hr) ($H_2$, CO, and $CH_4$) | 2.36E+09 |
| Oxygen/coal (dry), (wt/wt) | 0.69 |
| Cold syngas efficiency (HHV) | 84.6% |

The scope of protection sought is not intended to be limited by the description or examples set out above, but only by the claims that follow, the scope including all equivalents of the subject matter of the claims. Each and every claim is hereby incorporated into the specification as an embodiment of the present invention. Thus, the claims are a further description of, and are an addition to the preferred embodiments of the present invention.

What is claimed is:

1. A gasification process, comprising the steps of:
    (a) providing a gasification reactor comprising a reactor upper section and a reactor lower section;
    (b) introducing a solid carbonaceous feedstock and a gas stream into a chamber downstream of the gasification reactor and mixing therein to produce a warm solid-gas mixture comprising a substantially dry solid carbonaceous feedstock, wherein the gas stream comprises syngas produced by the gasification reactor of step (a), wherein said warm solid-gas mixture is maintained at a temperature that minimizes the formation of tar;
    (c) separating the warm solid-gas mixture in a separating device to produce a separated substantially dry carbonaceous feedstock and a separated gaseous product;
    (d) passing the separated substantially dry carbonaceous feedstock into the reactor upper section and reacting therein with a first mixture product from a reactor lower section to form a second mixture product, wherein the temperature of the second mixture product leaving the reactor upper section is in a range of between 1500° F. to 2000° F.;
    (e) passing the separated gaseous product to a particulate filtering device to separate out at least a portion of the residual solid fines and particulates and produce a separated second gaseous product;
    (f) passing the residual solid fines and particulates separated by the particulate filtering device to the reactor upper section;
    (g) cooling the separated second gaseous product in a heat recovery unit to produce a cooled second gaseous product and steam, wherein the cooled second gaseous product stream is fed as the gas stream to the solid-gas mixing chamber of step (b), and wherein the steam is fed to the reactor lower section.

2. The process of claim 1, wherein said warm solid-gas mixture is maintained at a temperature in a range of 300° F. to 1000° F. when inside the chamber.

3. The process of claim 1, wherein said warm solid-gas mixture is maintained at a temperature in a range of 500° F. to 800° F. when inside the chamber.

4. A gasification process, comprising:
    contacting a feedstock comprising particulate carbonaceous material with a gasification reactor product stream in a solid-gas mixer to form a solid-gas mixture at a temperature that minimizes the formation of tar;
    separating the solid-gas mixture in a first separating device to recover a substantially dry feedstock and a gasification product stream;
    feeding the substantially dry feedstock to a reactor upper section of a gasification reactor, comprising a reactor lower section and the reactor upper section, and reacting therein with a first mixture product from the reactor lower section to form a second mixture product comprising gasification reaction products and solid fines and particulates;
    separating the second mixture product in a second separating device to recover a stream comprising the solid fines and particulates and the gasification reactor product stream;
    cooling the separated second gaseous product in a heat recovery unit to produce a cooled second gaseous product and steam, wherein the cooled second gaseous product stream is fed as the gasification reactor product stream to the solid-gas mixer, and wherein the steam is fed to the reactor lower section.

5. The process of claim 4, wherein said solid-gas mixture is maintained at a temperature in a range of 300° F. to 1000° F.

6. The process of claim 4, wherein said solid-gas mixture is maintained at a temperature in a range of 500° F. to 800° F.

7. The process of claim 4, wherein the temperature of the second mixture product leaving the reactor upper section is in a range of between 1500° F. to 2000° F.

8. The process of claim 4, further comprising feeding the solid fines and particulates recovered from the second separating device to the reactor lower section and reacting therein to form the first mixture product.

9. The process of claim 4, further comprising separating the gasification product stream in a third separation device to recover a gaseous product stream substantially free of particulates and a residual solid fines and particulates stream.

10. The process of claim 9, further comprising feeding the residual solid fines and particulates stream to the reactor upper section.

* * * * *